Dec. 1, 1953  R. L. NEEDHAM  2,661,172
MOTOR CRADLE
Filed Sept. 18, 1952

INVENTOR.
ROBERT L. NEEDHAM
BY
his ATTORNEYS

Patented Dec. 1, 1953

2,661,172

UNITED STATES PATENT OFFICE 2,661,172

MOTOR CRADLE

Robert L. Needham, Dayton, Ohio, assignor to General Motors Corporation, Detroit, Mich., a corporation of Delaware Application September 18, 1952, Serial No. 310,239

8 Claims. (Cl. 248—19)

This invention relates to an improved cradle for mounting an electric machine such as a motor or a generator.

It is among the objects of the present invention to provide a motor mount or cradle, made up of bar metal or wire struts so fashioned and secured together, preferably by welding, as to provide a cradle which is sturdy and sufficiently rigid to withstand the strains and stresses caused by vibrations particularly developed when the electric motor is started or is subjected to an overload.

Further objects and advantages of the present invention will be apparent from the following description, reference being had to the accompanying drawings wherein a preferred embodiment of the present invention is clearly shown.

Figure 3:
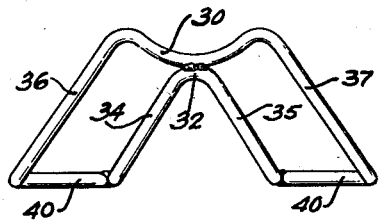
Fig. 3 is an end view of the cradle shown in Fig. 2.

Referring to the drawings, the cradle is shown as consisting of a main strut 20 and a reenforcing strut 21. Each strut is made of bar material shown to be wire, in the form of an elongated loop the meeting ends of which are securely joined, preferably by welding. Each strut has two spaced, substantially parallel, straight base portions which are longer in one strut than in the other. In the drawings the reenforcing strut 21 has substantially parallel, straight base portions 22 and 23 which are comparatively longer than the corresponding base portions 24 and 25 of the main strut 20. Base portions 22 and 23 of the reenforcing strut are spaced a lesser distance apart than the base portions 24 and 25 of the main strut and thus lie within the confines of the base portions 24 and 25 and in the same plane so that all four base portions 24, 22, 23 and 25 may seat and rest evenly upon a common flat base. The closed end, loop portions of both struts, starting from the extremities of the parallel base portions, converge, as shown in Fig. 3, the converging end portions of the main strut being bent to form a circular concaved portion 30 and 31 respectively which are central of the longitudinal center of the cradle and form receptacles in which the hubs of the motor may rest. The converging loop ends of the reenforcing strut form rounded apexes 32 and 33 respectively.

Figure 1:
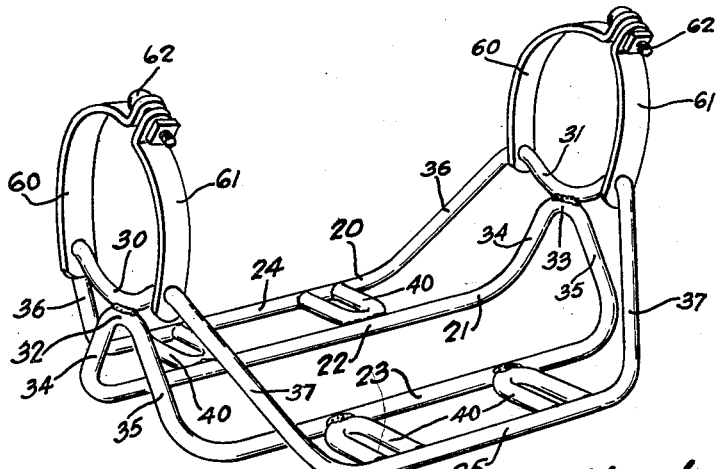
Fig. 1 is a perspective view of the improved cradle for an electric motor.
Figure 2:
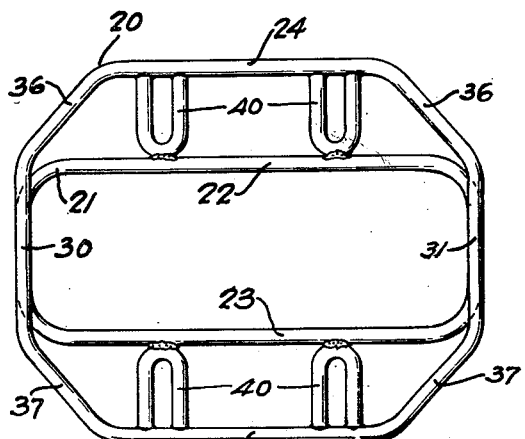
Fig. 2 is a plan view of the cradle.

The converging ends of both struts are bent upwardly and angularly relatively to the straight base portions so that the rounded apexes 32 and 33 of the reenforcing strut align with and engage the respective concaved portions 30 and 31 at the ends of the main strut, both struts being securely joined, preferably by welding at these points of engagement.

Where the straight base portions 22 and 23 of the reenforcing strut are longer than the straight base portions 24 and 25 of the main strut, as shown in Figs. 1 and 2, the loop ends 34 and 35 of the reenforcing strut are bent upwardly to a lesser angle relative to the base portions 24 and 25 at the loop ends 36 and 37 of the main strut so that the rounded apexes 32 and 33 of the reenforcing strut may align with and be welded to the concaved areas 30 and 31 in the respective loop ends of the main strut as shown in Fig. 3.

To further reenforce the cradle, horse-shoe shaped members 40 are secured between the straight base portions 21—24 and 23—25 of the two struts, the open ends of said members being welded to one strut and the closed, loop ends to the other strut. These members also provide means for receiving hold-down bolts for anchoring the cradle to a firm base.

Figure 5:
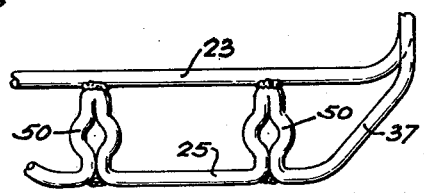
Fig. 5 shows a modified form of cradle reenforcing and stiffening means.

Fig. 5 illustrates a modified form of stiffening and hold-down members which consist of integral portions of one strut bent to provide an eyelet 50 for receiving hold-down bolts. The integral bent portions of the strut are contiguous so as to permit welding rigidly to hold the bent portions together and to permit welding of the rounded end of the bent portion of one strut to be welded to the straight base portions of the other strut.

To facilitate production of this wire cradle, the center and the two end portions thereof may be formed from separate pieces of stock in which case meeting or abutting ends are welded together to form the sturdy and rigid cradle. The angularity of the two end loop portions of the struts relatively to the straight base portions and the welding of the two struts together at their extreme ends and the provision of the stiffening members add to the rigidity of the device and its ability to withstand vibrations of the electric motor cradled thereon.

The two circularly shaped clamp members 60 and 61 hingedly secured to the respective ends of the main strut, each have clamping bolts 62 by means of which the collapsible clamps may be tightened about hubs on the motor for grasping and holding the motor tightly upon the concaved receptacle portions of the main strut.

Figure 4:
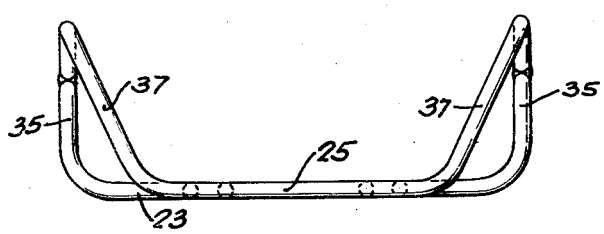
Fig. 4 is a side view of the cradle.

While the strut herein has been described in terms referring to the strut 20 as the "main strut" and the strut 21 as the "reenforcing strut" yet it is understood that rigid reenforcement of the end structure of the cradle results from the difference in the angular relationship between the loop ends 34—35 relative to the loop ends 36—37 whereby a triangular structure results from the relative position of the respective loop ends, as clearly shown in Fig. 4 of the drawings. The loop ends 36—37 also form a triangular structure relative to the base portions 22 and 23 of the strut 20, as shown in Fig. 2, whereby to obtain rigidity of the structure.

It is understood that the angular relationship of the loop ends 34—35 and 36—37 can be reversed with equivalent results.

While the embodiment of the present invention as herein disclosed, constitutes a preferred form, it is to be understood that other forms might be adopted.

What is claimed is as follows:

1. A cradle for supporting an electric machine said cradle consisting of a main strut in the form of an elongated, closed loop of metal bar material the meeting ends of which are welded together, said strut having two spaced, parallel base portions which converge and are bent upwardly at their respective ends, the converging straight end portions terminating in a circular, concaved portion substantially centrally of the spaced base portions; a reenforcing strut similar in general shape to the main strut, the two spaced, parallel base portions thereof being aligned with the base portion of the main strut and closer together, said base portions converging at their ends and being positioned at a lesser angle relative to the parallel portions than the ends of the main strut, the apexes of the ends of the reenforcing strut engaging and being welded to the concaved end portions of the main strut; and reenforcing members between the parallel portions of the two struts and welded thereto.

2. A cradle for supporting an electric machine said cradle consisting of a main and a reenforcing strut each in the form of an elongated closed loop of metal bar material the meeting ends of which are securely joined together, each strut having two spaced substantially parallel base portions, said base portions of the main strut being shorter and spaced farther apart than the corresponding base portions of the reenforcing strut, the closed end portions of both struts, starting from the parallel base portions thereof, converging, the end portions of the main strut to form a concaved area substantially centrally of the two struts and the end portions of the reenforcing strut to form rounded apexes respectively, said converging ends being bent upwardly and angularly relatively to the parallel base portions to cause the rounded apexes of the reenforcing strut to engage the adjacent concaved areas of the respective ends of the main strut to which they are securely joined; and means attached to the main strut for clamping an electric machine upon the concaved portion of the cradle.

3. A device as defined by claim 2 in which U-shaped stiffening members have their open ends securely joined to the parallel base portion of one strut and their loop ends to the other strut, a split ring hingedly secured to the concaved ends of the main strut for cooperating with said concaved end to form a hold-down and supporting ring for the electric machine.

4. A device as defined by claim 2 in which the one strut has bolt receiving members integral with its parallel base portions, each member being securely welded to the parallel base portion of the other strut, said members reenforcing and stiffening said base portions and providing means for receiving bolts to fasten the cradle to an immovable base.

5. A cradle for supporting an electric machine said cradle consisting of a main and a reenforcing strut each in the form of an elongated, closed loop of bar metal joined securely together at the meeting ends, each strut having two spaced, substantially parallel base portions longer in one strut than in the other, the strut portions beyond said parallel base portions being bent inwardly and upwardly relatively to said base portions, the extreme respective ends of one strut being bent to form depressed, circularly shaped receptacles for receiving and supporting the electric machine and the extreme respective ends of the other strut engaging and being securely joined to the said receptacle portions of the one strut; stiffening members rigidly securing the parallel base portions of both struts together said members having provisions for receiving hold-down bolts.

6. A cradle for supporting an electric machine, said cradle consisting of two bar struts each in the form of a closed loop with the meeting ends of each bar welded together, each strut having substantially straight, parallel intermediate portions which in the one strut are spaced a lesser distance apart than the corresponding portions of the second strut, each end portion of said second strut being substantially inverted V-shaped and bent upwardly angularly at substantially the area where the parallel bar portions begin to converge, the highest, central portion of each V-shaped end being convexedly bent to form a circularly shaped receptacle, the end portions of the second strut also being inverted V-shaped and bent upwardly angularly at substantially the area where the parallel bar portions thereof begin to converge, the apex portion of each end of the second strut engaging the circularly shaped receptacle portion of the first strut and being rigidly attached thereto so as to be immovable relative thereto; a plurality of stiffening bars secured to said struts between the parallel bar portions thereof so as to be immovable relatively thereto; and a circularly shaped collapsible clamp adjustably secured to each end of the second strut so as to cooperate with the circularly shaped receptacle portion thereof to form a substantially closed circular clamping support.

7. A cradle for supporting an electric machine, said cradle consisting of a main and a reenforcing strut, each in the form of an elongated closed loop of material bar material, the meeting ends of which are securely joined together, each strut having two spaced, substantially parallel base portions, the base portions of one of said struts being spaced closer together than the base portions of the other of said struts, said base portions of one of said struts being shorter than the corresponding base portions of the other of said struts, the closed ends of both of said struts converging and bent upwardly and angularly relative to the parallel base portions thereof, the same bent closed ends of one of said struts being positioned at a lesser angle relative to the base portions thereof than the bent end portions of the other of said struts and securely joined thereto, and stiffening members secured between the parallel base portions of both of said struts.

8. A cradle for supporting an electric machine, said cradle consisting of a main and a reenforcing strut, each in the form of an elongated closed loop of metal bar material, the meeting ends of which are securely joined together, each strut having two spaced, substantially parallel base portions, the base portions of one of said struts being spaced closer together than the base portions of the other of said struts, all of said base portions being disposed in a common plane, said base portions of one of said struts being shorter than the corresponding base portions of the other of said struts, the closed ends of both of said struts converging and bent upwardly and angularly relative to the parallel base portions thereof, the same bent closed ends of one of said struts being positioned at a lesser angle relative to the base portions thereof than the bent end portions of the other of said struts and securely joined thereto, and stiffening members secured between the parallel base portions of both of said struts.

ROBERT L. NEEDHAM.

No references cited.